(12) United States Patent
Lin

(10) Patent No.: US 7,729,544 B2
(45) Date of Patent: Jun. 1, 2010

(54) METHOD FOR ADJUSTING OPERATING FREQUENCY OF AN OPTICAL INPUT DEVICE ACCORDING TO REFERENCE FRAME CHANGES

(75) Inventor: Chun-Huang Lin, Hsin-Chu Hsien (TW)

(73) Assignee: PixArt Imaging Inc., Science-Based Industrial Park, Hsin-Chu Hsien (TW)

(*) Notice: Subject to any disclaimer, the term of this patent is extended or adjusted under 35 U.S.C. 154(b) by 658 days.

(21) Appl. No.: 11/422,600

(22) Filed: Jun. 7, 2006

(65) Prior Publication Data
US 2007/0002021 A1 Jan. 4, 2007

(30) Foreign Application Priority Data
Jul. 1, 2005 (TW) .............................. 94122409 A

(51) Int. Cl.
G06K 9/62 (2006.01)
G09G 5/08 (2006.01)

(52) U.S. Cl. ...................................... 382/209; 345/166
(58) Field of Classification Search ................. 382/209; 345/166
See application file for complete search history.

(56) References Cited

U.S. PATENT DOCUMENTS

| | | | |
|---|---|---|---|
| 6,455,840 B1 | 9/2002 | Oliver et al. | |
| 6,700,996 B1 | 3/2004 | Aldrich et al. | |
| 7,057,148 B2 * | 6/2006 | Wang | 250/208.1 |
| 2003/0081129 A1 * | 5/2003 | Lin et al. | 348/208.6 |
| 2004/0130532 A1 * | 7/2004 | Gordon et al. | 345/166 |
| 2005/0190158 A1 * | 9/2005 | Casebolt et al. | 345/166 |

FOREIGN PATENT DOCUMENTS

| | | |
|---|---|---|
| TW | 522738 | 3/2003 |
| TW | I227393 | 2/2005 |

* cited by examiner

Primary Examiner—Samir A Ahmed
Assistant Examiner—Fred Hu
(74) Attorney, Agent, or Firm—Winston Hsu

(57) ABSTRACT

A method for adjusting an operation frequency of an optical input device is introduced. The method includes capturing and setting a first image as a reference frame of the optical input device; capturing and setting a plurality of frames as a plurality of sample frames of the optical input device; analyzing the plurality of sample frames according to the reference frame; capturing a second image according to a predetermined rule and setting the second image as the reference frame of the optical input device instead of the first image; and adjusting an operation frequency of the optical input device according to a time interval between setting the first image as the reference frame of the optical input device and setting the second image as the reference frame of the optical input device.

10 Claims, 10 Drawing Sheets

METHOD FOR ADJUSTING OPERATING FREQUENCY OF AN OPTICAL INPUT DEVICE ACCORDING TO REFERENCE FRAME CHANGES

BACKGROUND OF THE INVENTION

1. Field of the Invention

The present invention relates to a method for controlling an optical input device, and more particularly, to a method for adjusting an operation frequency of an optical input device according to a change of a reference frame.

2. Description of the Prior Art

Recently, optical input devices, such as optical mouses, have become popular due to their accuracy and convenience in use. Furthermore, as wireless technology keeps growing, more and more optical input devices transmit data wirelessly. Generally, a wireless optical device is powered by a battery. However, the capacity of a battery is limited and needs to be replaced or recharged periodically. Therefore, how to reduce power consumption of a wireless optical input device becomes a major topic. To save power of a wireless optical input device, U.S. Pat. No. 6,455,840 discloses a method for automatically adjusting a sampling frequency of an image sensor by computing an equivalent moving speed of the wireless optical input device, when the equivalent moving speed of the wireless optical input device is decreased, the sampling frequency of the image sensor is reduced; when the equivalent moving speed of the wireless optical input device is increased, the sampling frequency of the image sensor is increased as well. However, because the wireless optical input device further needs a related circuit to compute the equivalent moving speed, the circuitry of the wireless optical input device becomes more complex, and thus restricts the applications of the method of the prior art.

SUMMARY OF THE INVENTION

It is therefore an objective of the claimed invention to provide a method for adjusting an operation frequency of an optical input device according to a change of a reference frame in order to solve the problems of the prior art.

The present invention provides a method for adjusting an operation frequency of an optical input device according to a change of a reference frame, the method comprises capturing and setting a first image as a reference frame of the optical input device; capturing and setting a plurality of images as a plurality of sample frames of the optical input device; analyzing the plurality of sample frames according to the reference frame; capturing a second image according to a predetermined rule and setting the second image as the reference frame of the optical input device instead of the first image; and adjusting an operation frequency of the optical input device according to a time interval between setting the first image as the reference frame of the optical input device and setting the second image as the reference frame of the optical input device.

Another method of the present invention comprises capturing and setting a first image as a reference frame of the optical input device; capturing and setting a plurality of images as a plurality of sample frames of the optical input device; analyzing the plurality of sample frames according to the reference frame; capturing a second image according to a predetermined rule and setting the second image as the reference frame of the optical input device instead of the first image; and adjusting an operation frequency of the optical input device according to number of the sample frames being analyzed during the period of the first image being set as the reference frame of the optical input device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
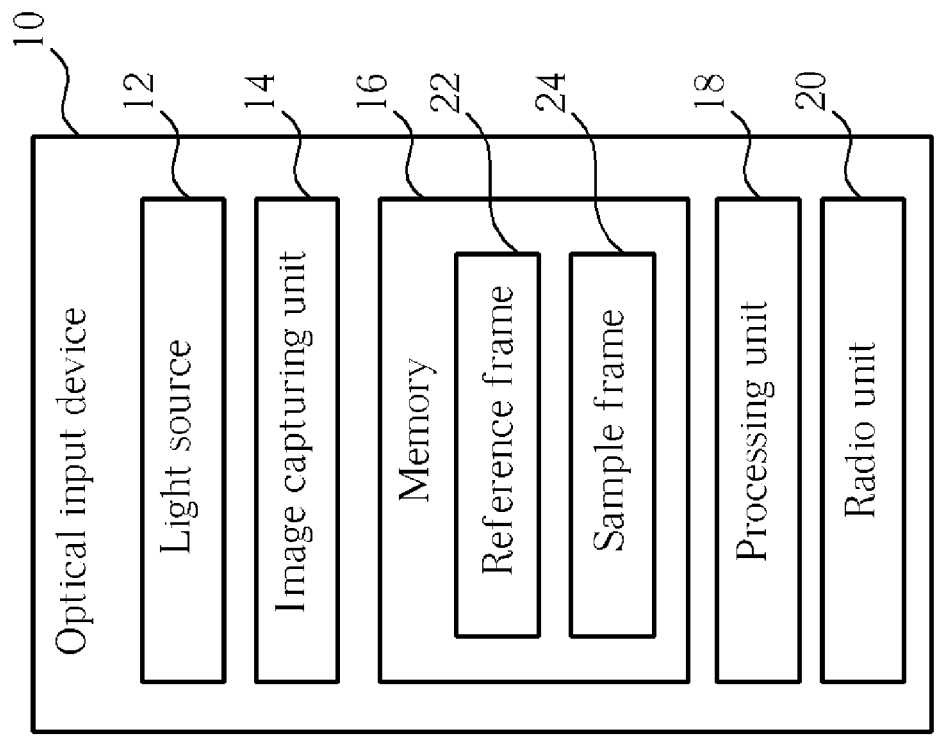
FIG. 1 is a block diagram of an optical input device according to the method of the present invention.
Figure 2:
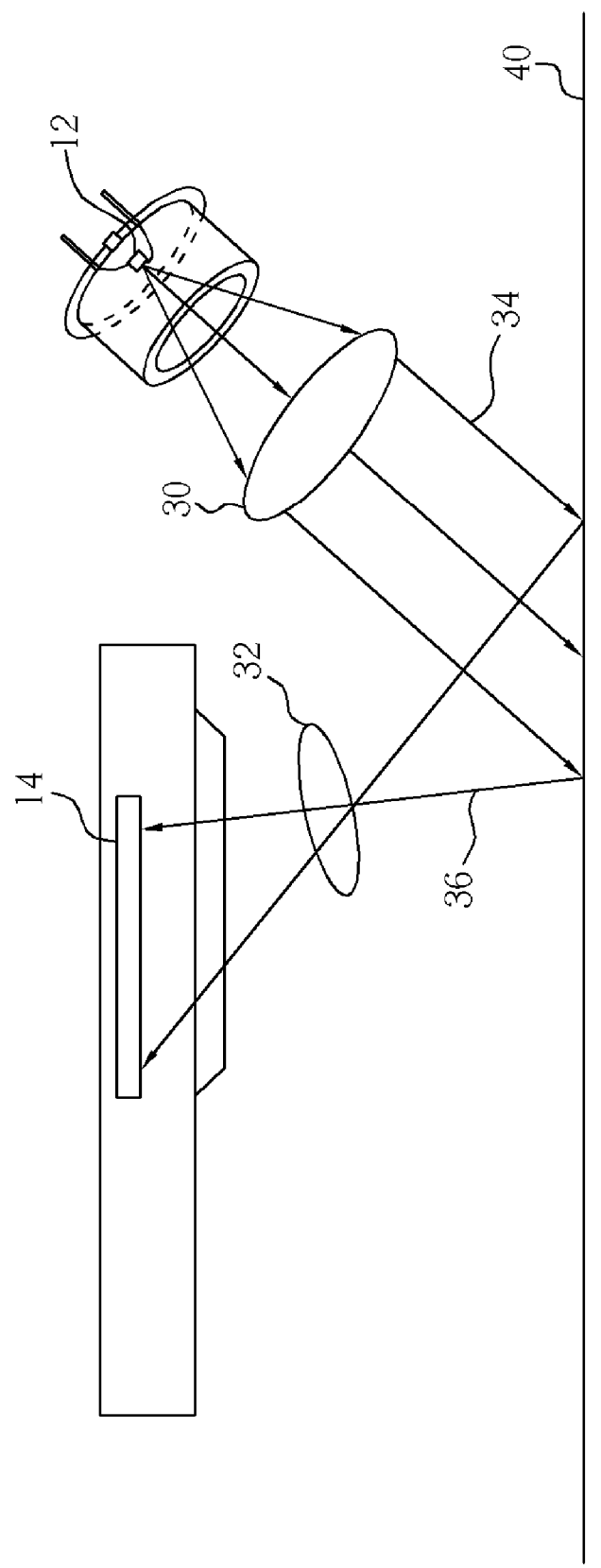
FIG. 2 is a diagram showing the light source and the image capturing unit in FIG. 1.

Please refer to FIG. 1, which shows a block diagram of an optical input device 10 of the present invention adjusting its operation frequency according to a change of a reference frame. The optical input device 10 comprises a light source 12 for generating light, an image capturing unit 14 for capturing images, a memory 16 for storing frames 22,24 captured by the image capturing unit 14, a processing unit 18 for analyzing frames 22,24 captured by the image capturing unit 14, and a radio unit 20 for wirelessly transmitting an index signal generated by the processing unit 18 after analyzing the frames 22,24. Please refer to FIG. 2 where the light source 12 and the image capturing unit 14 in FIG. 1 is displayed. A first lens 30 and a second lens 32 are installed between the light source 12 and the image capturing unit 14. The light 34 emitted from the light source 12 is focused by the first lens 30 and projected to a reflecting surface 40, and the reflecting surface 40 reflects the light 34 into reflecting light 36, which is focused by the second lens 32 and projected to the image capturing unit 14, such that the image capturing unit 14 can capture images by sensing images of the reflecting surface 40 from the reflecting light 36. In addition, the first lens 30 and the second lens 32 are not necessary in the present invention. Without having the first lens 30 and the second lens 32, the image capturing unit 14 can capture images by sensing images generated by interference of light.

Figure 3:
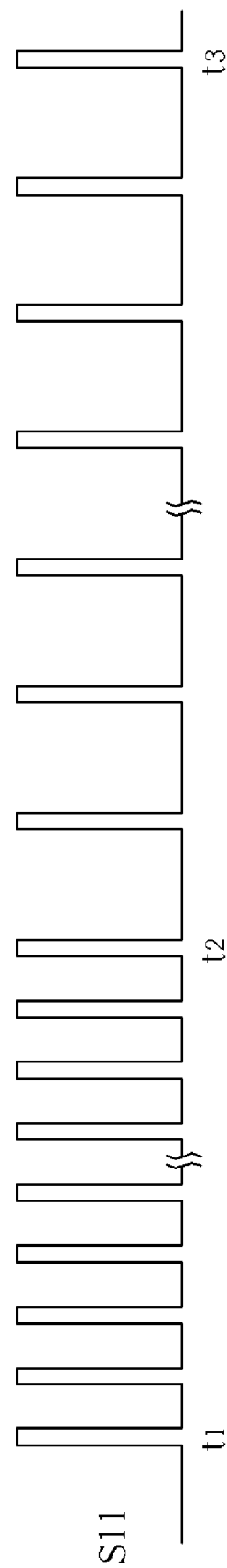
FIG. 3 is a time sequence diagram of a sampling pulse signal of the image capturing unit in the first embodiment of the present invention.

Please refer to FIG. 1 and FIG. 2 again. After the image capturing unit 14 captures images, one of the images is set as a reference frame 22, and the other images are set as sample frames 24. The processing unit 18 analyzes the plurality of sample frames 24 according to the reference frame 22 in order to find out the correlation between the plurality of sample frames 24 and the reference frame 22, and then the processing unit 18 generates a corresponding index signal according to the correlation. To clarify characteristics of the present invention, please refer to FIG. 3, and refer to FIG. 1 as well. FIG. 3 is a time sequence diagram of a sampling pulse signal S11 occurring when the image capturing unit 14 in FIG. 1 captures images. At time $t_1$, the image capturing unit 14 captures the reference frame 22, and after $t_1$, the image capturing unit 14 captures one sample frame 24 corresponding to each pulse, and then the processing unit 18 generates an index signal according to the correlation between the sample frames 24 and the reference frame 22. However, when the moving range of the optical input device 10 is too large and causes a huge difference between the reference frame 22 and the sample frames 24, the processing unit 18 is unable to generate an index signal according to the correlation between the sample frames 24 and the reference frame 22. Therefore, when the processing unit 18 is unable to generate an index signal according to the correlation between the sample frames 24 and the reference frame 22, the processing unit 18 will follow a predetermined rule to use another image (or use the current sample frame to store as reference frame) for replacing the reference frame 22 in the memory 16. According to the predetermined rule, a time for updating the reference frame 22 with the processing unit 18 could be at a time when the correlation between the sample frames 24 and the reference frame 22 is less than a critical value, when a noise of a frame is too large, or when there is no correlation between the sample frames 24 and the reference frame 22. In the preferred embodiment of FIG. 2, the processing unit 18 sets a frame, which is captured by the image capturing unit 14 at time $t_2$, as the new reference frame 22 for replacing the original reference frame 22 in the memory 16. When setting a new reference frame 22, the processing unit 18 will adjust the period of the sampling pulse signal S11 to change a capturing frequency of the image capturing unit 14. The longer the time interval $(t_1-t_2)$ is, the longer the reference frame 22 exists before being replaced, such that the capturing frequency of the sample frames 24 can be decreased. On the other hand, the shorter the time interval $(t_1-t_2)$ is, the shorter the reference frame 22 exists before being replaced, such that the capturing frequency of the sample frames 24 must be increased. For example, an optical mouse designed according to the method of the present invention can decrease the frequency of the sampling pulse signal S11 to a predetermined pulse frequency when the length of the time interval $(t_1-t_2)$ is longer than 10 ms. Therefore, the image capturing frequency of the image capturing unit 14 can be adjusted according to a change of the reference frame 22. One thing that needs to be noticed is besides the length of the time interval $(t_1-t_2)$, the capturing frequency of the image capturing unit 14 also can be adjusted according to number of the sample frames 24 being analyzed while a reference frame 22 exists before being replaced by another one. For example, if the number of the sample frames 24 being analyzed during the time interval $(t_1-t_2)$, which is equal to the number of pulses of the sampling pulse signal S11 occurring during the time interval $(t_1-t_2)$, is greater than 50, the predetermined rule can be set to decrease the frequency of the sampling pulse signal S11 from original 5000 Hz to 2500 Hz after time $t_2$. And to achieve the purpose of adjusting the capturing frequency of the image capturing unit 14 according to the number of the sample frames 24 being analyzed during the time interval $(t_1-t_2)$, a counter can be used for counting the number of pulses of the sampling pulse signal S11 occurring during the time interval $(t_1-t_2)$, and then compares the number of pulses counted by the counter with a predetermined critical value. When the counted number of pulses is greater than the predetermined critical value, the capturing frequency of the image capturing unit 14 is decreased. Therefore, when the method of the present invention detects a time interval of a reference frame of the optical input device 10 and decreases the capturing frequency of the image capturing unit 14, the power consumption of the optical input device 10 can be reduced for saving power.

Figure 4:
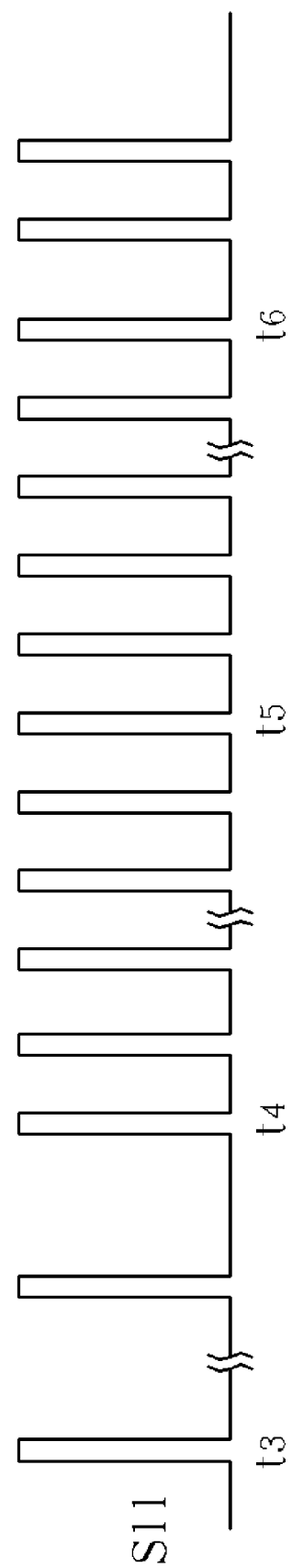
FIG. 4 is another time sequence diagram of the sampling pulse signal of the image capturing unit in the first embodiment of the present invention.

In contrast with decreasing the capturing frequency of the image capturing unit 14 when sensing a reference frame exists for a longer time of the optical input device 10, the capturing frequency of the image capturing unit 14 also can be increased in some specific conditions. Please refer to FIG. 4, which is a time sequence diagram of a sampling pulse signal S11 occurring when the image capturing unit 14 in FIG. 1 captures images in another condition. The processing unit 18 updates the reference frame 22 in the memory 16 with images captured by the image capturing unit 14 at time $t_3$, $t_4$, $t_5$, and $t_6$ respectively. When the time interval $(t_4-t_3)$ is less than 2 ms, or number of sample frames occurring between time $t_3$ and time $t_4$ is less than 6, the frequency of the sampling pulse signal S11 will be increased from 2500 Hz to 5000 Hz after time $t_4$.

Figure 5:
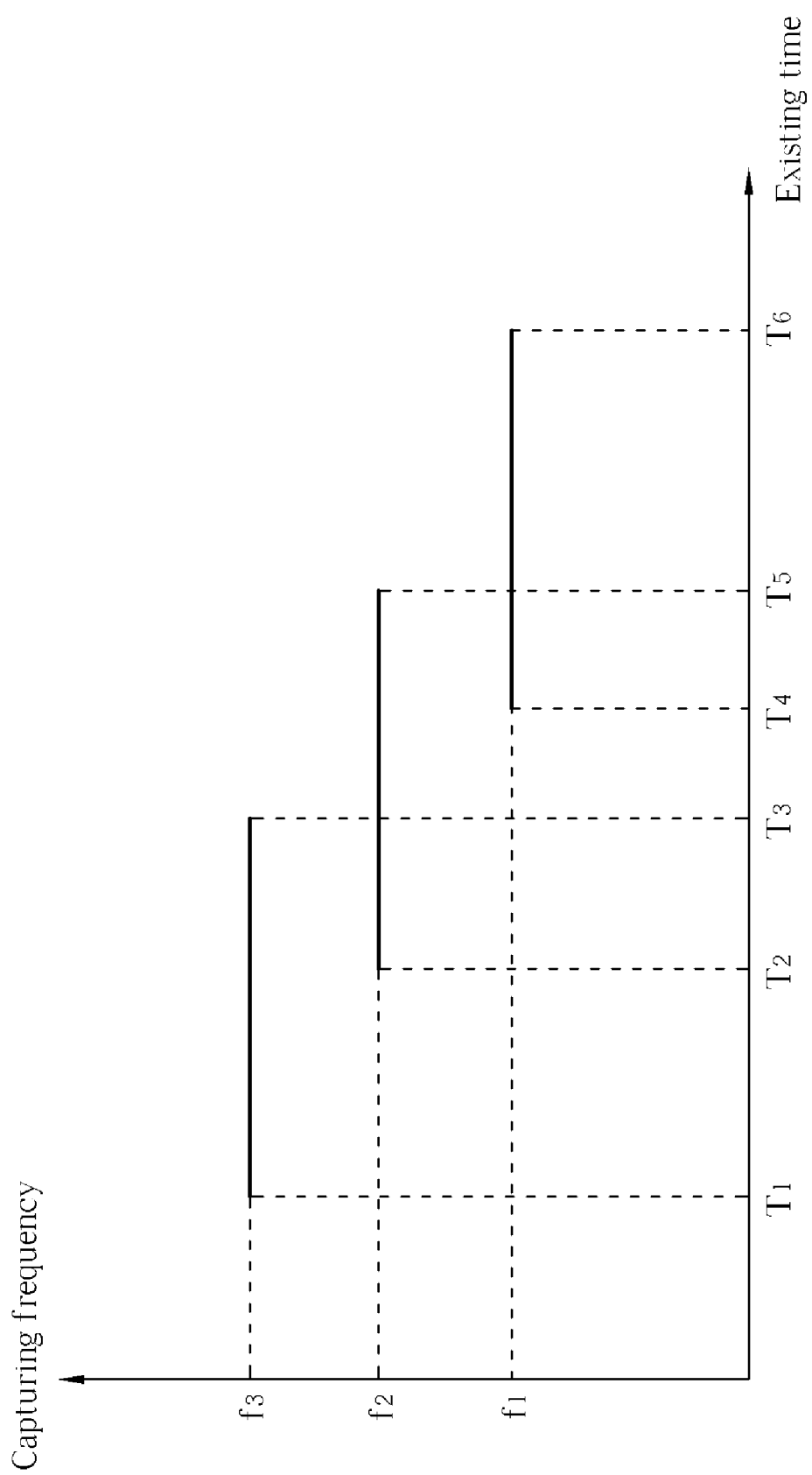
FIG. 5 is a diagram showing a relationship between an existing time of the reference frame and the capturing frequency of the image capturing unit of the optical input device in FIG. 1.

Please refer to FIG. 5, where a relationship between an existing time of the reference frame 22 and the capturing frequency of the image capturing unit 14 is illustrated. The capturing frequency of the image capturing unit 14 can be switched between three frequencies $f_1$, $f_2$, and $f_3$. When the capturing g frequency of the image capturing unit 14 is equal to $f_3$, the corresponding existing time of the reference frame 22 is greater than $T_1$, and less than $T_3$; when the capturing frequency of the image capturing unit 14 is equal to $f_2$, the corresponding existing time of the reference frame 22 is greater than $T_2$ and less than $T_5$; and when the capturing frequency of the image capturing unit 14 is equal to $f_1$, the corresponding existing time of the reference frame 22 is greater than $T_4$ and less than $T_6$. There are overlaps between each existing time of the reference frame 22, and as shown in the figure, the overlaps include $T_2$-$T_3$ and $T_4$-$T_5$. The above setting is for cushioning the switching of the capturing frequency in order to prevent irregular and frequent switching of the capturing frequency due to the existing time of the reference frame 22 usually falling next to some critical value.

Figure 6:
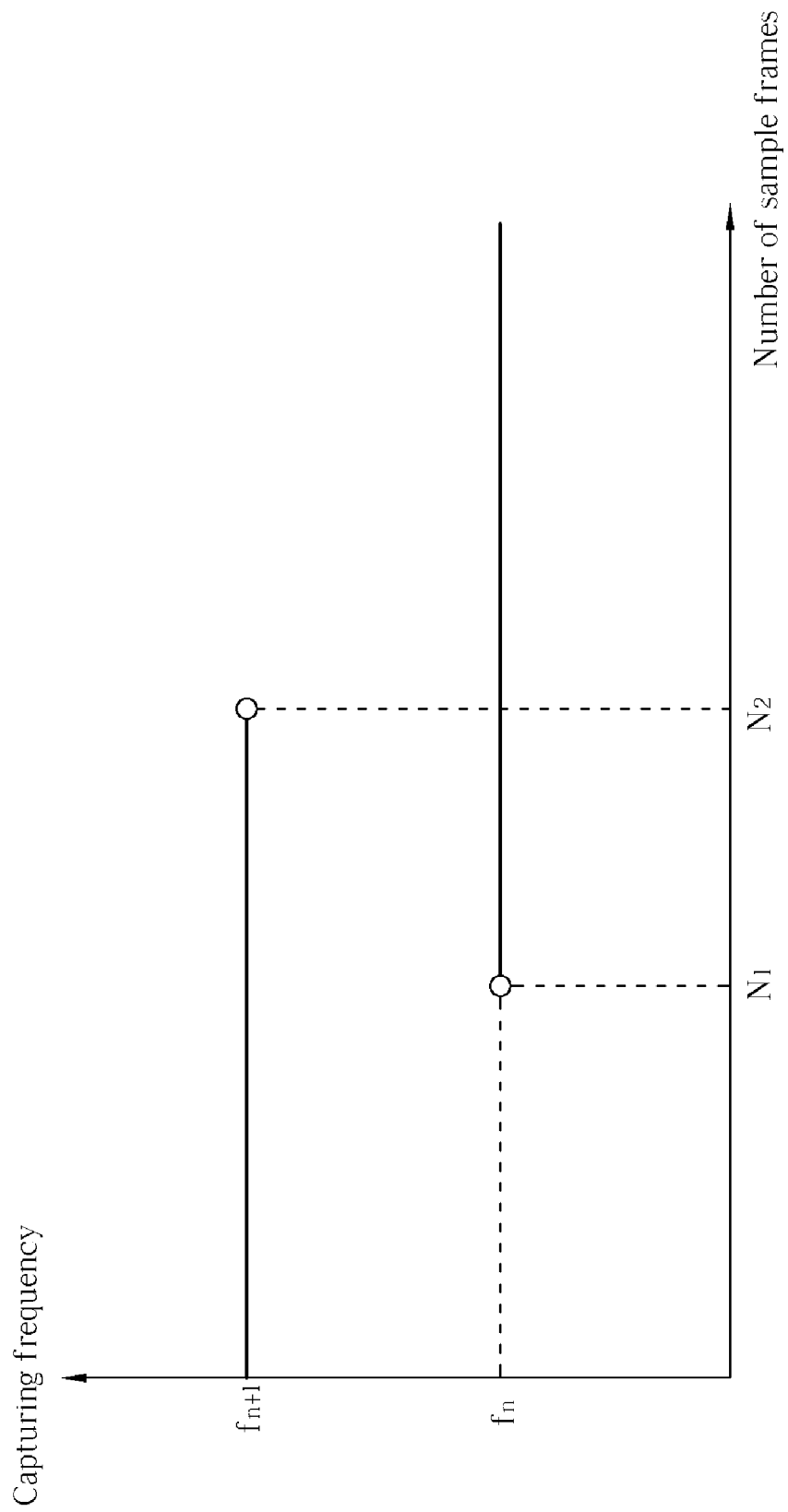
FIG. 6 is a diagram showing a relationship between number of the sample frames being analyzed and the capturing frequency of the image capturing unit in the second embodiment of the present invention.

Please refer to FIG. 6, where a relationship between the number of the sample frames 24 being analyzed and the capturing frequency of the image capturing unit 14 in a second embodiment of the present invention is illustrated. In the second embodiment of the present invention, the capturing frequency of the image capturing unit 14 also can be switched between the three frequencies $f_1$, $f_2$, and $f_3$, and in FIG. 6, the number of the analyzed sample frames $N_1$, $N_2$ have the below relationships with the existing time $T_1$-$T_6$ in FIG.5: $T_1=N_1/f_3$, $T_3=N_2/f_3$, $T_2=N_1/f_2$, $T_5=N_2/f_2$, $T_4=N_1/f_1$, and $T_6=N_2/f_1$. In addition, the capturing frequency $f_n$ could be $f_1$, or $f_2$, such that when the capturing frequency $f_n$ is equal to $f_1$, the capturing frequency $f_{n+1}$ is equal to $f_2$; and when the capturing frequency $f_n$ is equal to $f_2$, the capturing frequency $f_{n+1}$ is equal to $f_3$. When the number of the sample frames 24 being analyzed during an existing time of a reference frame 22 is greater than $N_1$, and less than $N_2$, the capturing frequency of the image capturing unit 14 will stay in the original value; when the number of the sample frames 24 being analyzed during an existing time of a reference frame 22 is less than $N_1$, the capturing frequency of the image capturing unit 14 will be raised from $f_n$ to $f_{n+1}$; and when the number of the sample frames 24 being analyzed during an existing time of a reference frame 22 is greater than $N_2$, the capturing frequency of the image capturing unit 14 will be reduced from $f_{n+1}$ to $f_n$. Therefore, the second embodiment of the present invention can have the same function as the embodiment shown in FIG. 5 by utilizing only a counter to count the number of the sample frames being analyzed during an existing time of a reference frame while setting two critical value $N_1$ and $N_2$.

Figure 7:
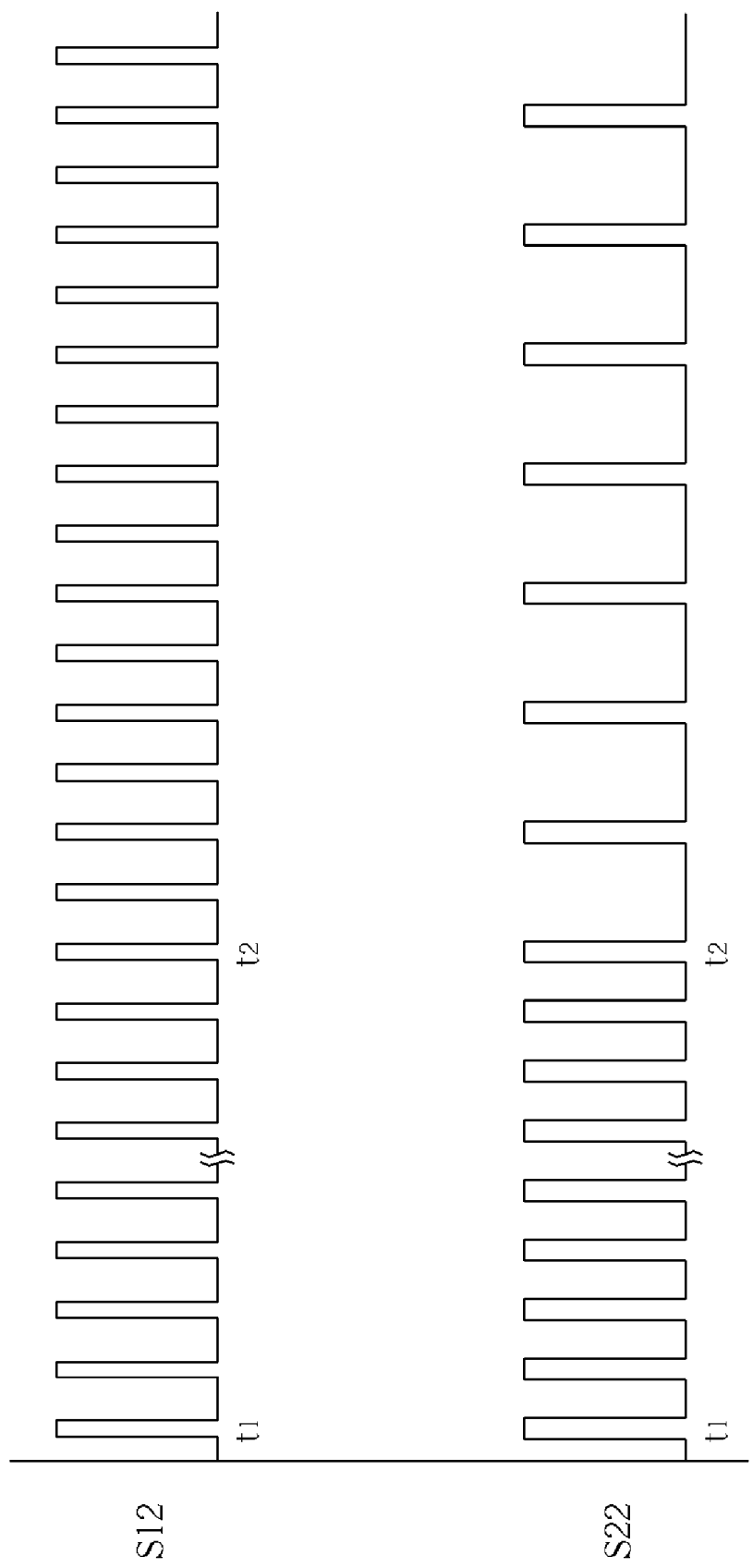
FIG. 7 is a time sequence diagram of a sampling pulse signal of the frame capturing unit in a third embodiment of the present invention.
Figure 8:
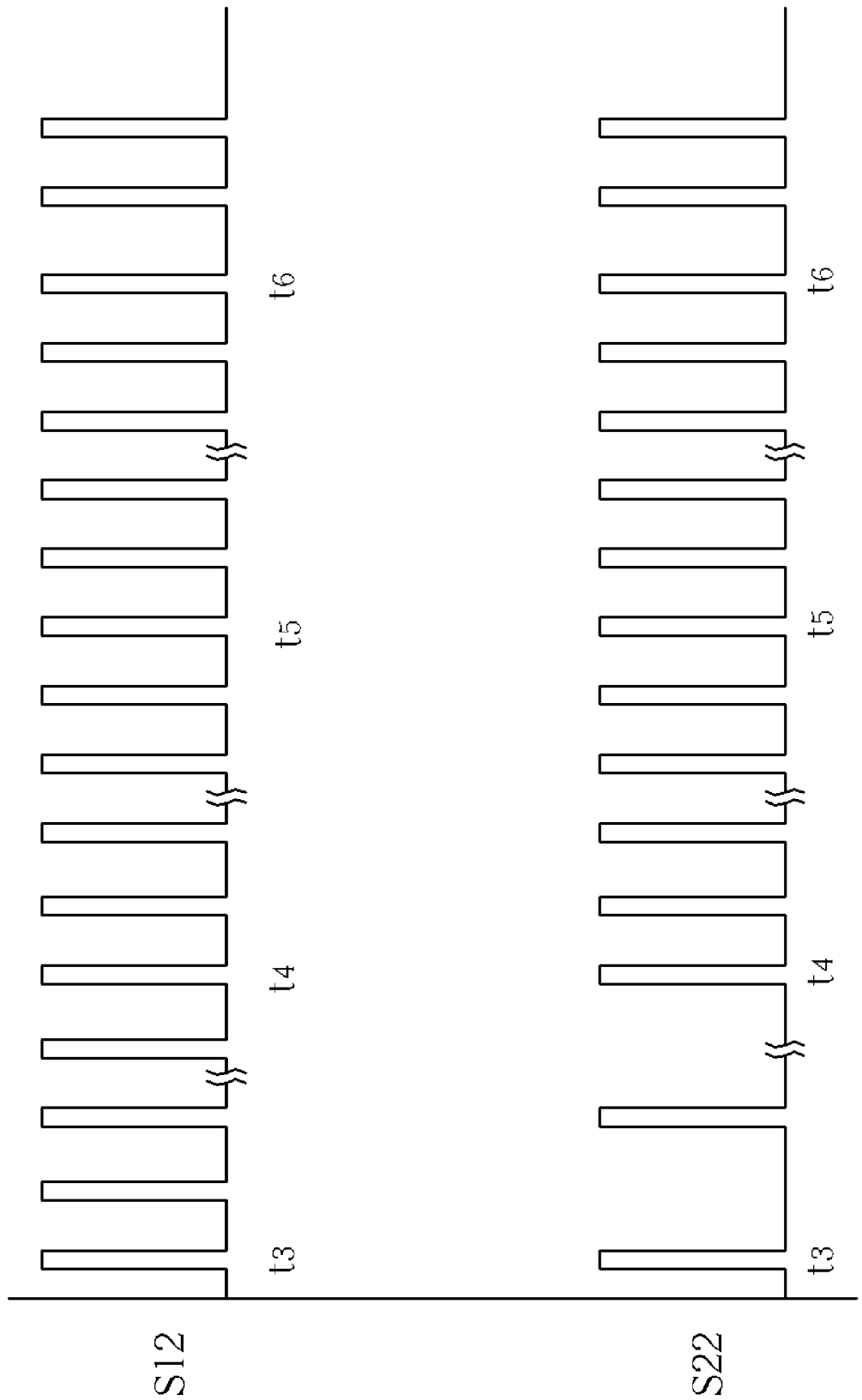
FIG. 8 is a time sequence diagram of a transmission pulse signal of the radio unit in the third embodiment of the present invention.

Please refer to FIG. 7 and FIG. 8, FIG. 7 is a time sequence diagram of a sampling pulse signal S12 of the image capturing unit 14 in a third embodiment of the present invention, and FIG. 8 is a time sequence diagram of a transmission pulse signal S22 of the radio unit 20 in the third embodiment of the present invention. The transmission pulse signal S22 is for driving the radio unit 20 to transmit signals. When the transmission pulse signal S22 is high, the radio unit 20 will transmit the index signal generated by the processing unit 18. For convenience, the time point $t_1$-$t_6$ shown in FIG. 7 and FIG. 8 corresponds to the time point $t_1$-$t_6$ shown in FIG. 3 and FIG. 4, which means the image capturing unit 14 will capture a frame as a reference frame 22 at each time point $t_1$-$t_6$. Different from the first embodiment, the frequency of the sampling pulse signal S22 of the image capturing unit 14 is fixed, but the frequency of the transmission pulse signal S22 of the radio unit 20 will be adjusted according to a change of the reference frame. When the length of the time interval ($t_2$-$t_1$) is longer than a predetermined value, the frequency of the transmission pulse signal S22 of the radio unit 20 will be decreased. On the other hand, when the length of the time interval ($t_2$-$t_1$) is shorter than a predetermined value, the frequency of the transmission pulse signal S22 of the radio unit 20 will be increased.

Figure 9:
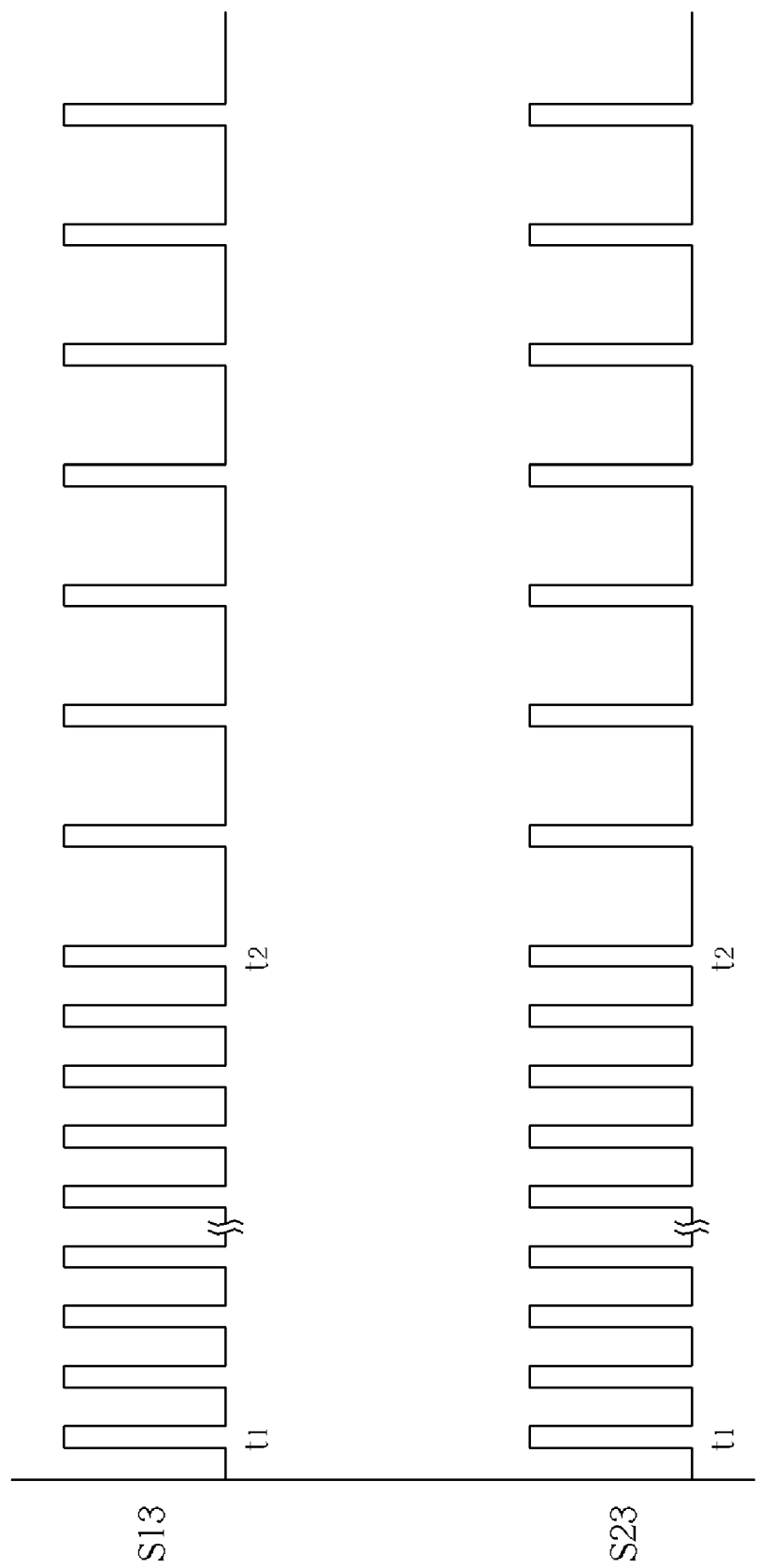
FIG. 9 is a time sequence diagram of a sampling pulse signal of the frame capturing unit in a fourth embodiment of the present invention.
Figure 10:
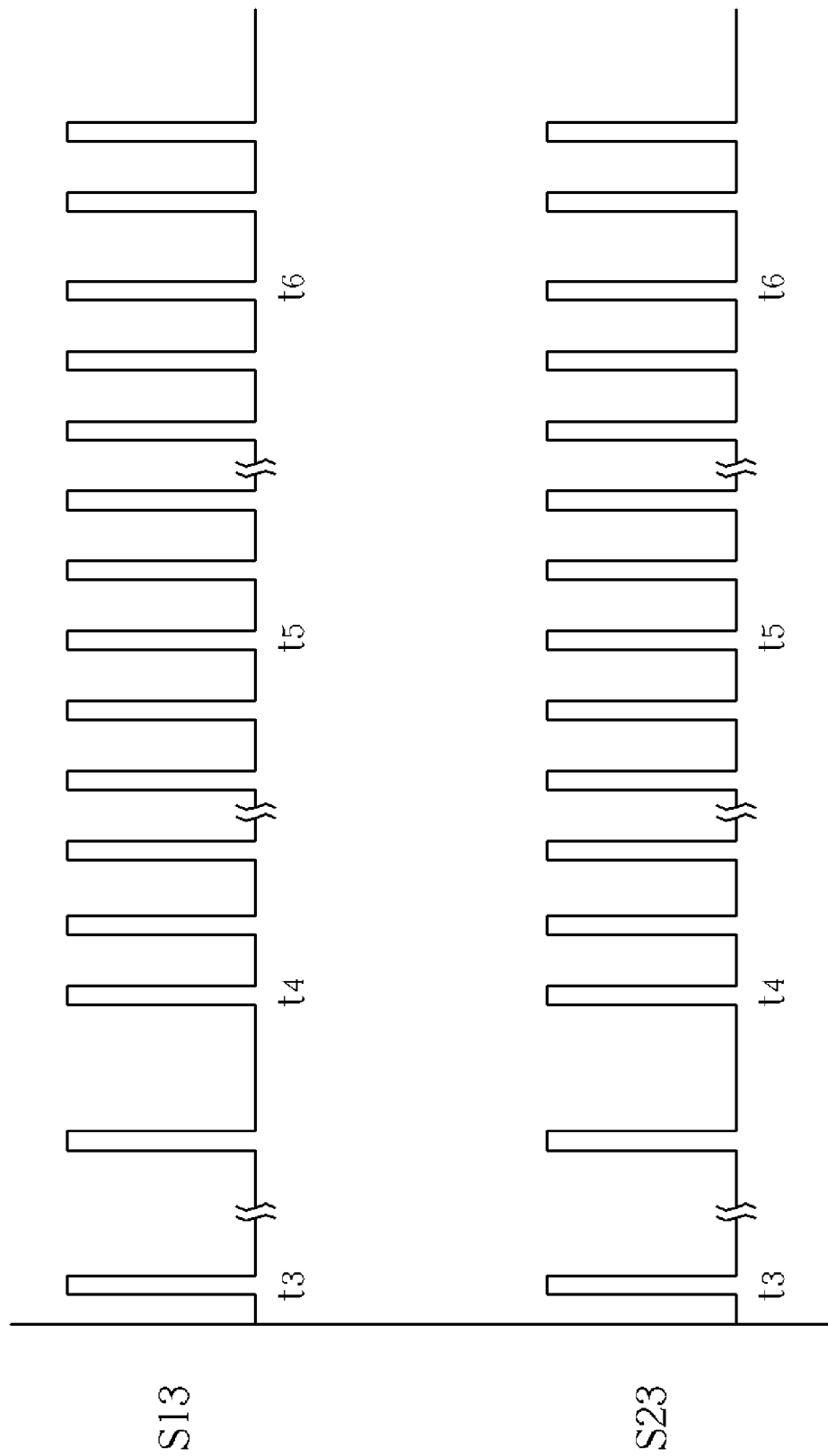
FIG. 10 is a time sequence diagram of a transmission pulse signal of the radio unit in the fourth embodiment of the present invention.

Please refer to FIG. 9 and FIG. 10, FIG. 9 is a time sequence diagram of a sampling pulse signal S13 of the image capturing unit 14 in a fourth embodiment of the present invention, and FIG. 10 is a time sequence diagram of a transmission pulse signal S23 of the radio unit 20 in the fourth embodiment of the present invention. In the fourth embodiment of the present invention, the transmission pulse signal S23 is also for driving the radio unit 20 to transmit signals. Similarly, for convenience, the time point $t_1$-$t_6$ shown in FIG. 9 and FIG. 10 corresponds to the time point $t_1$-$t_6$ shown in FIG. 3 and FIG. 4, which means the image capturing unit 14 will capture an image a reference frame 22 at each time point $t_1$-$t_6$. Different from the first and third embodiment, not only the frequency of the sampling pulse signal S13 of the image capturing unit 14 will be adjusted according to a change of the reference frame 22, but also the frequency of the transmission pulse signal S22 of the radio unit 20 is as well. When the length of the time interval ($t_2$-$t_1$) is longer than a predetermined value, both the frequency of the sampling pulse signal S13 of the image capturing unit 14 and the frequency of the transmission pulse signal S22 of the radio unit 20 will be decreased. On the other hand, when the length of the time interval ($t_2$-$t_1$) is shorter than a predetermined value, both the frequency of the sampling pulse signal S13 of the image capturing unit 14 and the frequency of the transmission pulse signal S22 of the radio unit 20 will be increased.

One thing that needs to be noticed is the on/off switching of the light source 12 also can be controlled according to the sampling pulse signal S1 of the image capturing unit 14 for further saving the power of the optical input device 10. When the sampling pulse signal S1 is high, the light source 12 is on, when the sampling pulse signal S1 is low, the light source 12 is off, such that the light source 12 is only turned on while the image capturing unit 14 captures images. Therefore, the on/off frequency of the light source 12 is also affected due to a change of the reference frame 22. Of course, the present invention is not restricted by the above embodiments, and the on/off frequency of the light source 12, the capturing frequency of the image capturing unit 14, and the signal transmitting frequency of the radio unit 20 can be singly or concurrently adjusted according to a change of a reference frame 22, such as an existing time of the reference frame 22 before being replaced, or the number of the sample frames 24 being analyzed during the existing time of the reference frame 22 before being replaced.

Summarizing the above, the present invention adjusts an operation frequency of an optical input device according to an existing time of the reference frame before being replaced, or the number of the sample frames 24 being analyzed during the existing time of the reference frame before being replaced. The operation frequency of the optical input device includes the capturing frequency of the image capturing unit 14, the on/off frequency of the light source, and the signal transmitting frequency of the radio unit etc. In addition, the capturing frequency of the image capturing unit 14, the on/off frequency of the light source, and the signal transmitting frequency of the radio unit can be singly or concurrently controlled.

In contrast to the prior art, the present invention adjusts an operation frequency of an optical input device according to a change of a reference frame. The operation frequency includes the capturing frequency of the image capturing unit 14, the on/off frequency of the light source, and the signal transmitting frequency of the radio unit. Therefore the method of the present invention can only utilize a timer or counter to count the changes of the reference frame, not like the prior art method that further needs a complex circuit to calculate the equivalent moving speed of the optical input device. Accordingly, in the structure of the circuitry, the optical input device of the present invention is simpler, such that it reduces the difficulty and complexity of designing the optical input device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adjusting an operation frequency of an optical input device according to a change of a reference frame, the method comprising the following steps:
   (a) capturing and setting a first image as a reference frame of the optical input device;
   (b) capturing and setting an image as a sample frame of the optical input device;
   (c) analyzing the sample frame according to a correlation between the sample frame and the reference frame;
   (d) when the correlation between the reference frame and the sample frame is less than a critical value, capturing a second image and setting the second image as the reference frame of the optical input device instead of the first image; and
   (e) adjusting number of images captured per second by the optical input device according to a time interval between setting the first image as the reference frame of the optical input device and setting the second image as the reference frame of the optical input device;

wherein the optical input device comprises an image capturing unit; wherein step (a) and step (b) utilize the image capturing unit to capture images, and step (e) comprises adjusting a capturing frequency of the image capturing unit according to the time interval between setting the first image as the reference frame of the optical input device and setting the second image as the reference frame of the optical input device.

2. The method of claim 1 wherein step (e) comprises decreasing the number of images captured per second by the optical input device when the time interval between setting the first image as the reference frame of the optical input device and setting the second image as the reference frame of the optical input device is longer than a predetermined value.

3. The method of claim 1 wherein step (e) comprises increasing the number of images captured per second by the optical input device when the time interval between setting the first image as the reference frame of the optical input device and setting the second image as the reference frame of the optical input device is shorter than a predetermined value.

4. The method of claim 1 wherein the optical input device comprises a light source for providing light to capture frames; wherein step (e) comprises adjusting an on/off frequency of the light source according to the time interval between setting the first image as the reference frame of the optical input device and setting the second image as the reference frame of the optical input device.

5. The method of claim 1 wherein the optical input device comprises a radio unit for transmitting signals, wherein step (e) comprises adjusting a signal transmitting frequency of the radio unit according to the time interval between setting the first image as the reference frame of the optical input device and setting the second image as the reference frame of the optical input device.

6. A method for adjusting an operation frequency of an optical input device according to a change of a reference frame, the method comprising the following steps:

(a) capturing and setting a first image as a reference frame of the optical input device;

(b) capturing and setting a plurality of images as a plurality of sample frames of the optical input device;

(c) analyzing the plurality of sample frames according to a correlation between the plurality of sample frames and the reference frame;

(d) when the correlation between the reference frame and the plurality of sample frames is less than a critical value, capturing a second image and setting the second image as the reference frame of the optical input device instead of the first image; and (e) adjusting number of images captured per second by the optical input device according to number of the sample frames being analyzed during a period of the first image being set as the reference frame of the optical input device;

wherein the optical input device comprises a image capturing unit, wherein step (a) and step (b) utilize the image capturing unit to capturing images, and step (e) comprises adjusting a capturing frequency of the image capturing unit according to the number of the sample frames being analyzed during the period of the first image being set as the reference frame of the optical input device.

7. The method of claim 6 wherein step (e) comprises increasing the number of images captured per second by the optical input device when the number of the sample frames being analyzed during the period of the first image being set as the reference frame of the optical input device is less than a predetermined value.

8. The method of claim 6 wherein step (e) comprises decreasing the number of images captured per second by the optical input device when the number of the sample frames being analyzed during the period of the first image being set as the reference frame of the optical input device is greater than a predetermined value.

9. The method of claim 6 wherein the optical input device comprises a light source for providing light to capture frames, wherein step (e) comprises adjusting an on/off frequency of the light source according to the number of the sample frames being analyzed during the period of the first image being set as the reference frame of the optical input device.

10. The method of claim 6 wherein the optical input device comprises a radio unit for transmitting signals; wherein step (e) comprises adjusting a signal transmitting frequency of the radio unit according to the number of the sample frames being analyzed during the period of the first image being set as the reference frame of the optical input device.

* * * * *